(12) United States Patent
Hasegawa et al.

(10) Patent No.: US 10,526,676 B2
(45) Date of Patent: *Jan. 7, 2020

(54) HIGH-STRENGTH STEEL SHEET AND METHOD FOR PRODUCING THE SAME

(71) Applicant: JFE STEEL CORPORATION, Tokyo (JP)

(72) Inventors: Hiroshi Hasegawa, Fukuyama (JP); Shinjiro Kaneko, Chiba (JP); Yoichi Makimizu, Fukuyama (JP); Yoshitsugu Suzuki, Fukuyama (JP)

(73) Assignee: JFE STEEL CORPORATION, Tokyo (JP)

( * ) Notice: Subject to any disclaimer, the term of this patent is extended or adjusted under 35 U.S.C. 154(b) by 744 days.

This patent is subject to a terminal disclaimer.

(21) Appl. No.: 15/104,609

(22) PCT Filed: Nov. 27, 2014

(86) PCT No.: PCT/JP2014/005941
§ 371 (c)(1),
(2) Date: Jun. 15, 2016

(87) PCT Pub. No.: WO2015/092982
PCT Pub. Date: Jun. 25, 2015

(65) Prior Publication Data
US 2016/0312329 A1 Oct. 27, 2016

(30) Foreign Application Priority Data
Dec. 18, 2013 (JP) ................. 2013-260987

(51) Int. Cl.
| | | |
|---|---|---|
| C22C 38/00 | (2006.01) |
| C21D 9/46 | (2006.01) |
| C23C 2/06 | (2006.01) |
| C23C 2/28 | (2006.01) |
| C23C 2/40 | (2006.01) |
| C22C 38/38 | (2006.01) |
| C22C 38/58 | (2006.01) |
| C22C 18/04 | (2006.01) |
| C21D 8/02 | (2006.01) |
| B32B 15/01 | (2006.01) |
| C22C 38/02 | (2006.01) |
| C22C 38/04 | (2006.01) |
| C22C 38/06 | (2006.01) |
| C22C 38/20 | (2006.01) |
| C22C 38/22 | (2006.01) |
| C22C 38/24 | (2006.01) |

(Continued)

(52) U.S. Cl.
CPC .............. *C21D 9/46* (2013.01); *B32B 15/013* (2013.01); *C21D 8/0205* (2013.01); *C21D 8/0226* (2013.01); *C21D 8/0236* (2013.01); *C21D 8/0247* (2013.01); *C21D 8/0263* (2013.01); *C21D 8/0278* (2013.01); *C22C 18/04* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/48* (2013.01); *C22C 38/50* (2013.01); *C22C 38/54* (2013.01); *C22C 38/58* (2013.01); *C23C 2/02* (2013.01); *C23C 2/06* (2013.01); *C23C 2/28* (2013.01); *C23C 2/285* (2013.01); *C23C 2/36* (2013.01); *C23C 2/40* (2013.01); *C21D 2211/005* (2013.01); *C21D 2211/008* (2013.01)

(58) Field of Classification Search
CPC ............ B32B 15/013; C21D 2211/008; C21D 8/0205; C21D 8/0226; C21D 8/0236; C21D 8/0247; C21D 8/0263; C21D 8/0278; C21D 9/46; C22C 38/00; C23C 2/02
USPC .......................................................... 148/320
See application file for complete search history.

(56) References Cited

U.S. PATENT DOCUMENTS 10,196,727 B2 * 2/2019 Takagi ...................... C23C 2/02
10,227,672 B2 * 3/2019 Hasegawa ................. C23C 2/02
(Continued)

FOREIGN PATENT DOCUMENTS

CN 102227511 A 10/2011
CN 102918174 A 2/2013
(Continued)

OTHER PUBLICATIONS

Supplementary European Search Report for EP 14873009.6, dated Sep. 20, 2016, 9 pages.
Chinese Office Action/Search Report with partial English language translation for Application No. 201480069326.8, dated Dec. 23, 2016, 9 pages.
International Search Report and Written Opinion of the International Searching Authority for International Application No. PCT/JP2014/005941 dated Feb. 10, 2015.
(Continued)

*Primary Examiner* — Jie Yang
(74) *Attorney, Agent, or Firm* — RatnerPrestia

(57) ABSTRACT

Provided are a high-strength steel sheet, which is suitable as a material of automotive parts, and a method for producing the high-strength steel sheet. In the high-strength steel sheet, the C content is 0.15% or less, the area ratio of ferrite is 8% to 45%, the area ratio of martensite is 55% to 85%, the proportion of martensite grains adjacent to only ferrite grains in the entire microstructure is 15% or less, the average crystal grain sizes of ferrite and martensite are each 10 μm or less, and the area ratio of ferrite grains having a size of 10 μm or more to all the ferrite grains included in a portion of the steel sheet which extends from 20 to 100 μm below the surface thereof is less than 5%.

9 Claims, No Drawings

(51) Int. Cl.
  *C22C 38/26*  (2006.01)
  *C22C 38/28*  (2006.01)
  *C22C 38/32*  (2006.01)
  *C22C 38/48*  (2006.01)
  *C22C 38/50*  (2006.01)
  *C22C 38/54*  (2006.01)
  *C23C 2/02*  (2006.01)
  *C23C 2/36*  (2006.01)

(56) References Cited

U.S. PATENT DOCUMENTS

| | | | |
|---|---|---|---|
| 2011/0240176 A1 | 10/2011 | Kaneko | |
| 2013/0071687 A1 | 3/2013 | Takagi | |
| 2016/0312329 A1* | 10/2016 | Hasegawa | C23C 2/06 |

FOREIGN PATENT DOCUMENTS

| | | |
|---|---|---|
| EP | 2202327 A1 | 6/2010 |
| EP | 2371979 | 10/2011 |
| EP | 2578718 | 4/2013 |
| EP | 2757171 A1 | 7/2014 |
| JP | 2009209384 | 9/2009 |
| JP | 2009263686 A | 11/2009 |
| JP | 2010070843 A | 4/2010 |
| JP | 2010255094 | 11/2010 |
| JP | 2011132602 | 7/2011 |
| JP | 2011241430 A | 12/2011 |
| JP | 2012012703 | 1/2012 |
| JP | 5136609 B2 | 11/2012 |
| JP | 2012229466 A | 11/2012 |
| JP | 2012237042 | 12/2012 |
| JP | 5167865 B2 | 3/2013 |
| JP | 2013108154 A | 6/2013 |
| KR | 20100046057 A | 5/2010 |

OTHER PUBLICATIONS

Chinese Office Action for Chinese Application No. 201480069326.8, dated Dec. 19, 2017, including Concise Statement of Relevance of Office Action, 6 pages.

Korean Notice of Allowance for Korean Application No. 10-2016-7018811, dated Nov. 16, 2017 with translation, 2 pages.

Chinese Office Action for Chinese Application No. 201480069326.8, dated Sep. 1, 2017, including Concise Statement of Relevance of Office Action, 5 pages.

Korean Office Action for Korean Application No. 10-2016-7018811, dated Aug. 16, 2017, including Concise Statement of Relevance of Office Action, 6 pages.

* cited by examiner

HIGH-STRENGTH STEEL SHEET AND METHOD FOR PRODUCING THE SAME

CROSS-REFERENCE TO RELATED APPLICATIONS

This is the U.S. National Phase application of PCT International Application No. PCT/JP2014/005941, filed Nov. 27, 2014, and claims priority to Japanese Patent Application No. 2013-260987, filed Dec. 18, 2013, the disclosures of each of these applications being incorporated herein by reference in their entireties for all purposes.

FIELD OF THE INVENTION

The present invention relates to a high-strength steel sheet having excellent spot weldability, excellent ductility, and excellent bending workability which is suitable as a steel sheet for automobiles and a method for producing the high-strength steel sheet.

BACKGROUND OF THE INVENTION

One of the important issues in which the automobile industry has always been engaged is to reduce the weights of automobile bodies while maintaining the strengths thereof and to thereby enhance the fuel economy of the automobiles in order to reduce the amount of $CO_2$ emission from the viewpoint of global environmental protection.

For reducing the weights of automobile bodies while maintaining the strengths thereof, it is effective to increase the strength of steel sheets used as a material of automotive parts and thereby reduce the thickness of the steel sheets. Since automotive parts are commonly formed into shape by press working, burring, or the like, the high-strength steel sheets used as a material of automotive parts are to have excellent formability in addition to a desired strength.

Recently, high-strength steel sheets having a tensile strength of more than 1180 MPa have been increasingly used as a material of automobile body frames. Since such high-strength steel sheets are generally bent when formed into shape, the high-strength steel sheets are to have excellent bending workability. Furthermore, such materials of automobile body frames are to have resistance to deformation, that is, a high yield strength, in order to ensure the safety of occupants at the time of impact or the like. It is particularly difficult to address the above issues in the case where the high-strength steel sheet is a hot-dip galvanized steel sheet. In order to meet the above-described requirements, for example, Patent Literature 1 discloses a technique concerning a steel sheet having a strength of about 1180 MPa which has a high yield strength and excellent bending workability.

In the technique disclosed in Patent Literature 1, the C content in the steel sheet having a tensile strength of about 1180 MPa is high, that is, specifically, 0.16% or more. Therefore, it is not considered that the steel sheet having a tensile strength of about 1180 MPa disclosed in Patent Literature 1 has sufficient spot weldability, which is one of the important properties for steel sheets for automobiles.

Patent Literature 2 discloses a technique concerning a high-strength steel sheet having a low C content, that is, specifically, 0.15% by mass or less. Although the high-strength steel sheet disclosed in Patent Literature 2 has good spot weldability and good bending workability, the yield strength of the high-strength steel sheet disclosed in Patent Literature 2 is low, that is, specifically, less than 780 MPa.

In Patent Literature 2, any approach to increase the yield strength of the high-strength steel sheet is not studied.

[PTL 1] Japanese Unexamined Patent Application Publication No. 2012-237042

[PTL 2] Japanese Unexamined Patent Application Publication No. 2011-132602

SUMMARY OF THE PRESENT INVENTION

An aim of the present invention is to address the above-described issues of the related art in an advantageous manner and to provide a high-strength steel sheet having a yield strength (YS) of 780 MPa or more, a tensile strength (TS) of 1180 MPa or more, excellent spot weldability, excellent ductility, and excellent bending workability which is suitable as a material of automotive parts and a method for producing the high-strength steel sheet.

In order to address the above issues and to produce a high-strength steel sheet having excellent spot weldability, excellent ductility, and excellent bending workability while maintaining a YS of 780 MPa or more and a TS of 1180 MPa or more, the inventors of the present invention conducted extensive studies from the viewpoints of the composition and the microstructure of the steel sheet and a method for producing the steel sheet. As a result, the inventors found that a high-strength steel sheet having a YS of 780 MPa or more, a TS of 1180 MPa or more, excellent spot weldability, excellent ductility, and excellent bending workability may be produced by setting the C content to 0.15% by mass or less, the area ratio of ferrite to 8% to 45%, the area ratio of martensite to 55% to 85%, the proportion of martensite grains adjacent to only ferrite grains in the entire microstructure to 15% or less, each of the average crystal grain sizes of ferrite and martensite to 10 μm or less, and the area ratio of ferrite grains having a size of 10 μm or more to all the ferrite grains included in a portion of the steel sheet which extends from 20 to 100 μm below the surface thereof to less than 5%. More specifically, one embodiment of the present invention provides the following.

(1) A high-strength steel sheet having excellent spot weldability, excellent ductility, and excellent bending workability, the high-strength steel sheet including a composition containing, by mass, C: 0.05% to 0.15%, Si: 0.01% to 1.00%, Mn: 1.5% to 4.0%, P: 0.100% or less, S: 0.02% or less, Al: 0.01% to 0.50%, Cr: 0.010% to 2.000%, Nb: 0.005% to 0.100%, Ti: 0.005% to 0.100%, B: 0.0005% to 0.0050%, and the balance being Fe and inevitable impurities, wherein K represented by Formula (I) below is 3.0 or more; and a microstructure in which, when the microstructure is observed in a cross section of the steel sheet which is perpendicular to the surface of the steel sheet at a depth of ¼ thickness below the surface of the steel sheet, the area ratio of ferrite is 8% to 45%, the area ratio of martensite is 55% to 85%, the proportion of martensite grains adjacent to only ferrite grains in the entire microstructure is 15% or less, the average crystal grain sizes of ferrite and martensite are each 10 μm or less, and the area ratio of ferrite grains having a size of 10 μm or more to all ferrite grains included in a portion of the steel sheet which extends from 20 to 100 μm below the surface of the steel sheet is less than 5%, $$K=-0.4\times[Si]+1.0\times[Mn]+1.3\times[Cr]+200\times[B] \quad \text{Formula (I),}$$

where [Si] represents the Si content [mass %], [Mn] represents the Mn content [mass %], [Cr] represents the Cr content [mass %], and [B] represents the B content [mass %].

(2) The high-strength steel sheet having excellent spot weldability, excellent ductility, and excellent bending workability described in (1), further containing, by mass, at least one element selected from Mo: 0.005% to 2.000%, V: 0.005% to 2.000%, Ni: 0.005% to 2.000%, and Cu: 0.005% to 2.000%.

(3) The high-strength steel sheet having excellent spot weldability, excellent ductility, and excellent bending workability described in (1) or (2), further containing, by mass, at least one element selected from Ca: 0.001% to 0.005% and REM: 0.001% to 0.005%.

(4) The high-strength steel sheet having excellent spot weldability, excellent ductility, and excellent bending workability described in any one of (1) to (3), being a high-strength cold-rolled steel sheet.

(5) The high-strength steel sheet having excellent spot weldability, excellent ductility, and excellent bending workability described in any one of (1) to (4), provided with a hot-dip galvanizing film deposited on a surface of the steel sheet.

(6) The high-strength steel sheet having excellent spot weldability, excellent ductility, and excellent bending workability described in (5), wherein the hot-dip galvanizing film is a hot-dip galvannealing film.

(7) A method for producing a high-strength steel sheet having excellent spot weldability, excellent ductility, and excellent bending workability, the method including a hot-rolling step in which, when a slab having the composition described in any one of (1) to (3) is hot-rolled, a finish-rolled steel sheet is cooled such that the steel sheet is retained at 600° C. to 700° C. for 10 seconds or less in total after being finish-rolled, and the cooled steel sheet is coiled at 400° C. or more and less than 600° C.; a cold-rolling step in which, subsequent to the hot-rolling step, the hot-rolled steel sheet is cold-rolled at a rolling reduction ratio of more than 20%; an annealing step in which, subsequent to the cold-rolling step, the cold-rolled steel sheet is heated to a target heating temperature of 680° C. or more at an average heating rate of 5° C./sec. or more, further heated to an annealing temperature of 720° C. to 820° C. within 500 seconds, and subsequently held at the annealing temperature for 10 to 1000 seconds; and a cooling step in which the annealed cold-rolled steel sheet is cooled to a cooling-stop temperature of 450° C. to 550° C. at an average cooling rate of 3° C./sec. or more and subsequently held at the cooling-stop temperature for 1000 seconds or less.

(8) The method for producing a high-strength steel sheet having excellent spot weldability, excellent ductility, and excellent bending workability described in (7), the method further including a galvanizing step in which a hot-dip galvanizing treatment is performed subsequent to the cooling step.

(9) The method for producing a high-strength steel sheet having excellent spot weldability, excellent ductility, and excellent bending workability described in (8), the method further including an alloying step in which an alloying treatment is performed subsequent to the galvanizing step.

According to an aspect of the present invention, a high-strength steel sheet having a YS of 780 MPa or more, a TS of 1180 MPa or more, excellent spot weldability, excellent ductility, and excellent bending workability may be produced. The high-strength steel sheet according to the present invention may be a high-strength cold-rolled steel sheet, a high-strength hot-dip galvanized steel sheet, or a high-strength hot-dip galvannealed steel sheet. These high-strength steel sheets are suitably used as a material of automotive parts.

DETAILED DESCRIPTION OF THE INVENTION

An embodiment of the present invention is described below. Note that, the present invention is not limited to the following embodiment.

The high-strength steel sheet according to an embodiment of the present invention (hereinafter, may be referred to simply as "steel sheet") is described below.

The high-strength steel sheet according to an embodiment of the present invention has a composition containing, by mass, C: 0.05% to 0.15%, Si: 0.01% to 1.00%, Mn: 1.5% to 4.0%, P: 0.100% or less, S: 0.02% or less, Al: 0.01% to 0.50%, Cr: 0.010% to 2.000%, Nb: 0.005% to 0.100%, Ti: 0.005% to 0.100%, B: 0.0005% to 0.0050%, and the balance being Fe and inevitable impurities. Furthermore, K represented by Formula (I) below is 3.0 or more. The composition of the steel sheet is described below. Hereinafter, "%" always denotes "% by mass".

C: 0.05% to 0.15%

C is an element important for the formation of martensite, which increases the TS of the steel sheet. If the C content is less than 0.05%, the strength of martensite becomes low and the TS of the steel sheet may fail to be 1180 MPa or more. On the other hand, a C content exceeding 0.15% may deteriorate the bending workability and the spot weldability of the steel sheet. Thus, the C content may be limited to be 0.05% to 0.15% and is preferably 0.06% to 0.12%.

Si: 0.01% to 1.00%

Si is an element effective for increasing the TS of the steel sheet by solid solution strengthening of steel. In order to achieve this effect, the Si content should be 0.01% or more. However, a Si content exceeding 1.00% may deteriorate ease of plating and the spot weldability of the steel sheet. Thus, the Si content may be limited to be 0.01% to 1.00%, is preferably 0.01% to 0.80%, and is more preferably 0.01% to 0.60%.

Mn: 1.5% to 4.0%

Mn is an element that increases the TS of the steel sheet by solid solution strengthening of steel. Mn also suppresses the occurrence of ferrite transformation and bainite transformation and allows martensite to be formed. This increases the YS and TS of the steel sheet. In order to achieve these effects, the Mn content should be 1.5% or more. However, a Mn content exceeding 4.0% may significantly increase the amount of inclusion, which reduces the index of cleanliness of steel and deteriorates the bending workability of the steel sheet. Thus, the Mn content may be limited to be 1.5% to 4.0%, is preferably 1.8% to 3.5%, and is more preferably 2.0% to 3.0%.

P: 0.100% or Less

P segregates at grain boundaries and deteriorates the bending workability and spot weldability of the steel sheet. Therefore, the P content is desirably as low as possible. The P content may be 0.100% or less from the viewpoints of the production cost and the like. Although the lower limit of the P content is not specified, the P content is preferably 0.001% or more because a P content of less than 0.001% may reduce the production efficiency.

S: 0.02% or Less

S is included in the steel sheet in the form of an inclusion such as MnS, which deteriorates the spot weldability of the steel sheet. Therefore, the S content is desirably as low as possible. The S content may be 0.02% or less from the viewpoint of the production cost. Although the lower limit of the S content is not specified, the S content is preferably 0.0005% or more because an S content of less than 0.0005% may reduce the production efficiency.

Al: 0.01% to 0.50%

Al, which serves as a deoxidizing agent, is preferably used in a deoxidation step. In order to achieve this effect, the Al content should be 0.01% or more. However, an Al content exceeding 0.50% may increase the risk of slabs cracking during continuous casting. Thus, the Al content may limited be 0.01% to 0.50%.

Cr: 0.010% to 2.000%

Cr is an element that suppresses the occurrence of ferrite transformation and bainite transformation and allows martensite to be formed, which increases the YS and TS of the steel sheet. In order to achieve this effect, the Cr content should be 0.010% or more. However, if the Cr content exceeds 2.000%, the effect may stop increasing, that is, become saturated. In addition, the production cost may be increased. Thus, the Cr content may be limited to be 0.010% to 2.000%, is preferably 0.010% to 1.500%, and is more preferably 0.010% to 1.000%.

Nb: 0.005% to 0.100%

Nb is an element effective for reducing the size of crystal grains by reducing the likelihood of ferrite recrystallizing during an annealing treatment. In order to achieve this effect, the Nb content should be 0.005% or more. However, if the Nb content exceeds 0.100%, the effect may stop increasing, that is, become saturated. In addition, the production cost may be increased. Thus, the Nb content may be limited to be 0.005% to 0.100%, is preferably 0.010% to 0.080%, and is more preferably 0.010% to 0.060%.

Ti: 0.005% to 0.100%

Ti is an element effective for reducing the size of crystal grains by reducing the likelihood of ferrite recrystallizing during an annealing treatment. In order to achieve this effect, the Ti content should be 0.005% or more. However, if the Ti content exceeds 0.100%, the effect may stop increasing, that is, become saturated. In addition, the production cost may be increased. Thus, the Ti content may be limited to be 0.005% to 0.100%, is preferably 0.010% to 0.080%, and is more preferably 0.010% to 0.060%.

B: 0.0005% to 0.0050%

B is an element effective for reducing the likelihood of ferrite and bainite nuclei being formed at grain boundaries and forming martensite. In order to achieve this effect to a sufficient degree, the B content should be 0.0005% or more. However, if the B content exceeds 0.0050%, the effect may stop increasing, that is, become saturated. In addition, the production cost may be increased. Thus, the B content may be limited to be 0.0005% to 0.0050%, is preferably 0.0015% to 0.0050%, and is more preferably 0.0020% to 0.0050%.

K≥3.0

K is represented by K=−0.4×[Si]+1.0×[Mn]+1.3×[Cr]+200×[B]. K is an empirical formula used as an index for setting the proportion of martensite grains adjacent to only ferrite grains in the entire microstructure to 15% or less in order to maintain linkages between martensite grains in a microstructure. If K is less than 3.0, the proportion of martensite grains adjacent to only ferrite grains may become large, which deteriorates the bending workability of the steel sheet. Thus, K may be limited to be 3.0 or more and is preferably 3.2 or more. In Formula (I), [Si] represents the Si content [mass %], [Mn] represents the Mn content [mass %], [Cr] represents the Cr content [mass %], and [B] represents the B content [mass %].

Fe and Inevitable Impurities

The balance is Fe and inevitable impurities. The above-described elements are the beneficial components of the high-strength steel sheet. In an embodiment of the present invention, the steel sheet may further contain the following optional components.

At Least One Element Selected from Mo: 0.005% to 2.000%, V: 0.005% to 2.000%, Ni: 0.005% to 2.000%, and Cu: 0.005% to 2.000%

Mo, V, Ni, and Cu are elements that increase the strength of the steel sheet by forming low-temperature transformation phases such as martensite. In order to achieve this effect, the content of at least one element selected from Mo, V, Ni, and Cu should be 0.005% or more. However, if any one of the contents of Mo, V, Ni, and Cu exceeds 2.000%, the effect may stop increasing, that is, become saturated. In addition, the production cost may be increased. Thus, the contents of Mo, V, Ni, and Cu may each be limited to 0.005% to 2.000%.

At Least One Element Selected from Ca: 0.001% to 0.005% and REM: 0.001% to 0.005%

Ca and REM are elements effective for improving the workability of the steel sheet by controlling the shapes of sulfides. In order to achieve this effect, the content of at least one element selected from Ca and REM should be 0.001% or more. However, if any one of the contents of Ca and REM exceeds 0.005%, the index of cleanliness of steel may be affected adversely and the properties of the steel sheet may be degraded. Thus, the contents of Ca and REM may each limited be to 0.001% to 0.005%.

The microstructure of the steel sheet according to an embodiment of the present invention is described below. In the microstructure of the steel sheet according to an embodiment of the present invention, when the microstructure is observed in a cross section of the steel sheet which is perpendicular to the surface thereof at a depth of ¼ thickness below the surface thereof, the area ratio of ferrite is 8% to 45%, the area ratio of martensite is 55% to 85%, the proportion of martensite grains adjacent to only ferrite grains in the entire microstructure is 15% or less, the average crystal grain sizes of ferrite and martensite are each 10 μm or less, and the area ratio of ferrite grains having a size of 10 μm or more to all the ferrite grains included in a portion of the steel sheet which extends from 20 to 100 μm below the surface thereof is less than 5%. The reasons for these exemplary limitations are described below.

Area Ratio of Ferrite: 8% to 45%

If the area ratio of ferrite is less than 8%, the ductility and bending workability of the steel sheet may be degraded. On the other hand, if the area ratio of ferrite exceeds 45%, it becomes difficult to set the YS of the steel sheet to 780 MPa or more and the TS of the steel sheet to 1180 MPa or more. Thus, the area ratio of ferrite may be limited to be 8% to 45%, is preferably 15% to 40%, and is more preferably 20% to 40%.

Area Ratio of Martensite: 55% to 85%

If the area ratio of martensite is less than 55%, it may become difficult to set the YS of the steel sheet to 780 MPa or more and the TS of the steel sheet to 1180 MPa or more. On the other hand, if the area ratio of martensite exceeds 85%, the ductility and bending workability of the steel sheet may be degraded. Thus, the area ratio of martensite may be limited to be 55% to 85%, is preferably 60% to 80%, and is more preferably 60% to 75%.

Proportion of Martensite Grains Adjacent to Only Ferrite Grains in Entire Microstructure: 15% or Less In a microstructure mainly composed of martensite, an isolated martensite grain adjacent to only ferrite grains may deteriorate the bending workability of the steel sheet. Although the mechanisms by which this phenomenon occurs have not been clarified, this is presumably because, for example, microcracking is likely to occur at the boundaries between such martensite grains and ferrite grains due to nonuniform stress distribution. If the proportion of martensite grains adjacent to only ferrite grains exceeds 15%, the bending workability of the steel sheet may be degraded. Thus, the proportion of martensite grains adjacent to only ferrite grains may be limited to be 15% or less, is preferably 10% or less, and is more preferably 5% or less.

Average Crystal Grain Sizes of Ferrite and Martensite: 10 μm or Less

In an embodiment of the present invention, it is preferred that both ferrite and martensite have a small crystal grain size. When both ferrite and martensite have a small crystal grain size, the ductility and bending workability of the steel sheet may be enhanced. If any one of the average crystal grain sizes of ferrite and martensite exceeds 10 μm, the ductility and bending workability of the steel sheet may be degraded. Thus, the average crystal grain sizes of ferrite and martensite may each be limited to 10 μm or less, is preferably 8 μm or less, is more preferably 5 μm or less, and is further preferably 3 μm or less.

Area Ratio of Ferrite Grains Having Size of 10 μm or More to all Ferrite Grains Included in Portion of Steel Sheet which Extends from 20 to 100 μm Below Surface: Less than 5%

If the area ratio of ferrite grains having a size of 10 μm or more to all the ferrite grains included in a portion of the steel sheet which extends from 20 to 100 μm below the surface of the steel sheet (hereinafter, this portion may be referred to as "surface-layer portion") is 5% or more, the bending workability of the steel sheet may be degraded. Although the mechanisms by which this phenomenon occurs have not been clarified, this is presumably because, in a microstructure constituted by uniform and fine grains as in an embodiment of the present invention, the inclusion of coarse grains may cause nonuniform stress distribution, which deteriorates the bending workability of the steel sheet. This particularly greatly affects the surface-layer portion in which cracks may form and propagate. Therefore, if the proportion of ferrite grains having a size of 10 μm or more in the surface-layer portion is 5% or more, the bending workability of the steel sheet may be degraded. Thus, the area ratio of ferrite grains having a size of 10 μm or more to all the ferrite grains included in the surface-layer portion may be limited to be less than 5%. Note that, the term "surface of the steel sheet" used herein as in "from 20 to 100 μm below the surface of the steel sheet" literally refers to the surface of the steel sheet. In other words, in the case where the high-strength steel sheet is a high-strength cold-rolled steel sheet, the term "surface of the steel sheet" refers to the surface of the cold-rolled steel sheet. In the case where the high-strength steel sheet is a high-strength hot-dip galvanized steel sheet, the term "surface of the steel sheet" refers to the surface of the hot-dip galvanized steel sheet. The same applies to a high-strength hot-dip galvannealed steel sheet.

The microstructure may include phases other than ferrite or martensite, that is, e.g., bainite, pearlite, and retained austenite. Since the other phases are not advantageous for increasing the YS of the steel sheet and enhancing the bending workability of the steel sheet, the total area ratio of the other phases may be limited to be less than 20%, is preferably less than 15%, and is more preferably less than 8%.

The term "area ratio" used herein refers to the ratio of the area of each phase to the area of the observed region. The area ratio of each phase is calculated by the following method. A cross section of the steel sheet which is perpendicular to the surface thereof is ground and subsequently corroded with a 3% nital solution. An image of a portion of the cross section at a depth of ¼ thickness below the surface thereof is captured with a SEM (scanning electron microscope) at a 1500-fold magnification for 3 fields of view. The area ratio of each phase is determined from the image data by using "Image-Pro" produced by Media Cybernetics, Inc. The average of the area ratios of each phase determined from the three fields of view is considered to the area ratio of the phase. It is possible to differentiate between ferrite and martensite since, in the image data, ferrite appears in black and martensite appears in white.

The average crystal grain sizes of ferrite and martensite are derived from the image data used for calculating the area ratio of each phase in the following manner. The total areas of ferrite grains and martensite grains included in each field of view are divided by the numbers of ferrite grains and martensite grains, respectively, in order to calculate the average crystal grain areas of ferrite and martensite. The square roots of the average crystal grain areas of ferrite and martensite are considered to be the average crystal grain sizes of ferrite and martensite, respectively.

The high-strength steel sheet according to an embodiment of the present invention may be a high-strength cold-rolled steel sheet, may be a steel sheet provided with a hot-dip galvanizing film deposited on the surface thereof, that is, a high-strength hot-dip galvanized steel sheet, or may be a steel sheet provided with a hot-dip galvannealing film deposited on the surface thereof, that is, a high-strength hot-dip galvannealed steel sheet.

Hot-Dip Galvanizing Film and Hot-Dip Galvannealing Film

The hot-dip galvanizing film is a film mainly composed of Zn. The hot-dip galvannealing film is a film mainly composed of a Fe—Zn alloy, which is formed by diffusing Fe included in steel into a galvanizing film by an alloying reaction.

The hot-dip galvanizing film and the hot-dip galvannealing film may optionally contain elements other than Zn, that is, specifically, Fe, Al, Sb, Pb, Bi, Mg, Ca, Be, Ti, Cu, Ni, Co, Cr, Mn, P, B, Sn, Zr, Hf, Sr, V, Se, and REM, as long as the advantageous effects of the present invention are not impaired.

Method for Producing High-Strength Steel Sheet

Regarding a method for producing the high-strength steel sheet according to an embodiment of the present invention, a preferable production method and preferable production conditions are described below. A preferable method for producing the high-strength steel sheet according to an embodiment of the present invention includes a hot-rolling step, a cold-rolling step, an annealing step, and a cooling step and may optionally further include a galvanizing step and an alloying step. The above steps are described below.

Hot-Rolling Step

In the hot-rolling step, a slab is finish-rolled; the finish-rolled steel sheet is cooled such that the steel sheet is retained at 600° C. to 700° C. for 10 seconds or less in total after being finish-rolled; and the cooled steel sheet is coiled at 400° C. or more and less than 600° C.

The preparation of the slab used in the hot-rolling step is described. A slab having the composition of the above-described steel sheet is prepared. The slab is preferably prepared by continuous casting in order to prevent occurrence of macro segregation. The slab may be prepared by a method other than continuous casting. For example, ingot casting and thin-slab casting may be employed. In the case where ingot casting is employed, after steel is prepared, the steel may be subjected to blooming rolling to form a slab.

The slab may be subsequently hot-rolled. For hot-rolling the slab, the slab may be cooled to room temperature and subsequently reheated. Alternatively, the slab may be charged into a heating furnace without being cooled to room temperature. In another case, an energy-saving process in which the temperature of the slab is maintained for a short time and the slab is immediately hot-rolled may be employed. For heating the slab, the slab is preferably heated to 1100° C. or more in order to dissolve carbides and prevent the rolling load from increasing. The slab-heating temperature is preferably 1300° C. or less in order to prevent the amount of scale loss from increasing.

When the slab is hot-rolled, it is possible to rough-roll the slab and subsequently heat the rough-rolled bar in order to lower the slab-heating temperature and reduce the risk of troubles which may occur in the rolling process. It is also possible to employ a "continuous rolling process" in which rough-rolled bars are joined to one another and continuously finish-rolled.

Finish rolling may increase the anisotropy of the steel sheet and deteriorate the workability of the steel sheet after cold rolling and annealing. Therefore, it is preferable to perform finish rolling with a finishing temperature equal to or higher than the $Ar_3$ transformation temperature. In order to reduce the rolling load and increase the homogeneity of the shape and quality of the steel sheet, it is preferable to perform lubrication rolling, in which the coefficient of friction is reduced to 0.10 to 0.25, in a part or the entirety of the path of finish rolling.

In aspects of the present invention, it is effective to adjust the conditions under which a treatment subsequent to the above-described finish-rolling process is performed. Specifically, it is preferable to cool the steel sheet such that the steel sheet is retained at 600° C. to 700° C. for 10 seconds or less in total after being finish-rolled and coil the cooled steel sheet at 400° C. or more and less than 600° C. The reasons for which the above conditions are preferable are described below.

If the time during which the steel sheet is retained at 600° C. to 700° C. after being finish-rolled exceeds 10 seconds, the content of solute B in steel may be reduced due to the formation of compounds containing B, such as B carbide. As a result, the effect of B which occurs during an annealing treatment may be reduced and it may become impossible to form the microstructure according to aspects of the present invention. Thus, the time during which the steel sheet is retained at 600° C. to 700° C. is limited to be 10 seconds or less in total and is preferably 8 seconds or less in total.

If the coiling temperature is 600° C. or more, the content of solute B in steel may be reduced due to the formation of compounds containing B, such as B carbide. As a result, the effect of B which occurs during an annealing treatment may be reduced and it may become impossible to form the microstructure according to aspects of the present invention. On the other hand, if the coiling temperature is less than 400° C., the shape of the steel sheet may be degraded. Thus, the coiling temperature is limited to be 400° C. or more and less than 600° C.

The coiled hot-rolled steel sheet is preferably subjected to the cold-rolling step described below after scale is removed from the steel sheet by pickling or the like.

Cold-Rolling Step

In the cold-rolling step, the hot-rolled steel sheet prepared in the hot-rolling step is preferably cold-rolled at a rolling reduction ratio of more than 20%. If the rolling reduction ratio is 20% or less, a difference in strain between the surface side and the inner side of the steel sheet is likely to be created during an annealing treatment. As a result, the uniformity of the crystal grain size may be reduced and it may become impossible to form the microstructure according to aspects of the present invention. Thus, the rolling reduction ratio at which cold rolling is performed is preferably limited to be more than 20% and is more preferably 30% or more. The upper limit of the rolling reduction ratio is not specified, but is preferably about 90% or less from the viewpoints of the stability of the shape of the steel sheet and the like.

Annealing Step

In the annealing step, the cold-rolled steel sheet prepared in the cold-rolling step is preferably heated to a target heating temperature of 680° C. or more at an average heating rate of 5° C./sec. or more, further heated to an annealing temperature of 720° C. to 820° C. within 500 seconds, and subsequently held at the annealing temperature for 10 to 1000 seconds. The reasons for which the above conditions are preferable are described below.

If the average heating rate at which the cold-rolled steel sheet is heated to the target heating temperature of 680° C. or more is less than 5° C./sec, the size of ferrite grains may become excessively large, which makes it difficult to form the microstructure according to aspects of the present invention. Thus, the average heating rate may preferably be limited to 5° C./sec. or more. The upper limit of the average heating rate is not specified, but is preferably 500° C./sec. or less from the viewpoint of production stability.

If the target heating temperature to which the cold-rolled steel sheet is heated at an average heating rate of 5° C./sec. or more is less than 680° C., the size of ferrite grains may become excessively large, which makes it difficult to form the microstructure according to aspects of the present invention. Thus, the target heating temperature to which the cold-rolled steel sheet is heated at an average heating rate of 5° C./sec. or more is preferably limited to 680° C. or more and is more preferably 700° C. or more. If the target heating temperature is equal to or higher than the annealing temperature, it becomes difficult to control the temperature. Thus, the upper limit of the target heating temperature may be substantially less than the annealing temperature from the viewpoint of productivity.

The annealing temperature may be set to 720° C. to 820° C., and the cold-rolled steel sheet is further heated from the above target heating temperature to the annealing temperature. In an embodiment of the present invention, the cold-rolled steel sheet is heated to the annealing temperature within 500 seconds (which is the time used to heat the steel sheet from the above target heating temperature to the annealing temperature). If the time used to heat the steel sheet exceeds 500 seconds, the size of crystal grains may become excessively large, which makes it difficult to form the microstructure according to aspects the present invention. Thus, the time used to heat the steel sheet to the above annealing temperature may be limited to 500 seconds or less and is preferably 300 seconds or less.

If the annealing temperature is less than 720° C., austenite may fail to be formed to a sufficient degree, and it may become difficult to form the microstructure according to aspects of the present invention. On the other hand, if the annealing temperature exceeds 820° C., the carbon content in the austenite may be reduced and the growth of ferrite and bainite may become excessive in the subsequent cooling and holding steps. As a result, it may become difficult to form the microstructure according to the present invention. Thus, the annealing temperature may be limited to 720° C. to 820° C. and is preferably 740° C. to 810° C.

If the time during which the steel sheet is held at the annealing temperature is less than 10 seconds, austenite may fail to be formed to a sufficient degree and it may become difficult to form the microstructure according to aspects of the present invention. On the other hand, if the above holding time exceeds 1000 seconds, the size of austenite grains may become excessively large, which makes it difficult to form the microstructure according to aspects of the present invention. Thus, the time during which the steel sheet is held at the annealing temperature may be limited to 10 to 1000 seconds and is preferably 30 to 500 seconds.

Cooling Step

In the cooling step, the annealed cold-rolled steel sheet is preferably cooled to a cooling-stop temperature of 450° C. to 550° C. at an average cooling rate of 3° C./sec. or more and subsequently held at the cooling-stop temperature for 1000 seconds or less. The reasons for which the above conditions are preferable are described below.

If the average cooling rate is less than 3° C./sec, the growth of ferrite and bainite during the cooling-holding process may become excessive and it may become difficult to form the microstructure according to the present invention. Thus, the average cooling rate may be limited to 3° C./sec. or more and is preferably 5° C./sec. or more. The upper limit of the average cooling rate is not specified, but is preferably 100° C./sec. or less in order to reduce factors in inhibiting production such as zigzags in the width direction of steel sheets.

If the cooling-stop temperature is less than 450° C., the growth of bainite may become excessive, which makes it difficult to form the microstructure according to aspects of the present invention. On the other hand, if the cooling-stop temperature exceeds 550° C., the growth of ferrite may become excessive, which makes it difficult to form the microstructure according to aspects of the present invention. Thus, the cooling-stop temperature is preferably limited to be 450° C. to 550° C.

If the time during which the steel sheet is held after being cooled exceeds 1000 seconds, the growth of bainite may become excessive, which makes it difficult to form the microstructure according to aspects of the present invention. Thus, the holding time may be limited to 1000 seconds or less and is preferably 500 seconds or less. The lower limit of the holding time is not specified, but is preferably 10 seconds or more from the viewpoint of temperature control performed subsequently when the steel sheet is dipped into a plating bath.

Galvanizing Step

In the galvanizing step, the cold-rolled steel sheet that has been subjected to the cooling step is subjected to a galvanizing treatment. In the galvanizing treatment, it is preferable to dip the steel sheet prepared above into a galvanizing bath of 440° C. or more and 500° C. or less and subsequently adjust the amount of metals deposited on the steel sheet by gas wiping or the like. In the galvanizing treatment, it is preferable to use a galvanizing bath having an Al content of 0.08% to 0.18%.

Alloying Treatment

The plating film deposited on the high-strength hot-dip galvanized steel sheet according to aspects of the present invention may be a hot-dip galvannealing film. In such a case, the high-strength hot-dip galvanized steel sheet according to an embodiment of the present invention is produced by a method including a hot-rolling step, a cold-rolling step, an annealing step, a cooling step, a galvanizing step, and an alloying step. The hot-rolling step, the cold-rolling step, the annealing step, the cooling step, and the galvanizing step may be the same as those described above, and the descriptions of these steps are omitted.

In an alloying treatment performed in the alloying step, it is preferable to hold the high-strength hot-dip galvanized steel sheet at 460° C. or more and 580° C. or less for 1 second or more and 40 seconds or less in order to perform alloying.

Other Treatments

The steel sheet that has been subjected to the cooling step, the galvanizing step, and, as needed, the alloying treatment, may optionally be temper-rolled in order to, for example, correct the shape of the steel sheet and adjust the surface roughness of the steel sheet. Subsequent to the cooling step, the galvanizing step, or the alloying treatment, the steel sheet may optionally be subjected to a coating treatment in which resin coating, oil and fat coating, or the like is performed.

EXAMPLES OF EMBODIMENTS OF THE PRESENT INVENTION

Exemplary, non-limiting steels having different compositions described in Table 1 were prepared in a vacuum melting furnace and were each subjected to blooming rolling to form a steel slab (in Table 1, N is an inevitable impurity). The steel slabs were each heated to 1200° C., subsequently rough-rolled, finish-rolled, and coiled to form a hot-rolled steel sheet (Tables 2 and 3 summarize the hot-rolling conditions). The hot-rolled steel sheets were each cold-rolled to a thickness of 1.4 mm to form a cold-rolled steel sheet (Tables 2 and 3 summarize the rolling reduction ratio). The cold-rolled steel sheets were subjected to an annealing treatment. The annealing treatment was performed in a laboratory under the conditions described in Tables 2 and 3, simulating a continuous annealing line or a continuous hot-dip galvanizing line. Thus, steel sheets 1 to 45, that is, cold-rolled steel sheets, hot-dip galvanized steel sheets, and hot-dip galvannealed steel sheets (i.e., steel sheets provided with a plating film that is a hot-dip galvannealing film), were prepared. The hot-dip galvanized steel sheets were each prepared by dipping the annealed cold-rolled steel sheet into a plating bath of 460° C. such that the amount of metals deposited on the surface thereof was 35 to 45 g/m$^2$ and subsequently cooling the steel sheet at a cooling rate of 10° C./second. The hot-dip galvannealed steel sheets were each prepared by performing an alloying treatment at 530° C. subsequent to the plating treatment and subsequently cooling the resulting steel sheet at a cooling rate of 10° C./second. The resulting steel sheets were subjected to skin pass rolling at a rolling reduction ratio of 0.3%.

The microstructures of the steel sheets 1 to 45 were confirmed. The area ratio of each phase was calculated by the following method. A cross section of each steel sheet which was perpendicular to the surface thereof was ground and subsequently corroded with a 3% nital solution. An image of a portion of the cross section at a depth of ¼ thickness below the surface thereof was captured with a SEM (scanning electron microscope) at a 1500-fold magnification for 3 fields of view. The area ratio of each phase was determined from the image data by using "Image-Pro" produced by Media Cybernetics, Inc. The average of the area ratios of each phase determined from the three fields of view was considered to the area ratio of the phase. The average crystal grain sizes of ferrite and martensite were derived from the image data used for calculating the area ratio of each phase in the following manner. The total areas of ferrite grains and martensite grains included in each field of view were divided by the numbers of ferrite grains and martensite grains, respectively, in order to calculate the average crystal grain areas of ferrite and martensite. The square roots of the average crystal grain areas of ferrite and martensite were considered to be the average crystal grain sizes of ferrite and martensite, respectively. Tables 4 and 5 summarize the results.

The tensile properties, bending properties, and spot weldability of each of the steel sheets 1 to 45 were determined in accordance with the following test methods.

<Tensile Test>

A JIS No. 5 tensile test specimen (JIS 22201) was taken from each of the steel sheets 1 to 45 in a direction perpendicular to the rolling direction. The test specimen was subjected to a tensile test conforming to JIS Z 2241 at a rate of strain of $10^{-3}$/sec. in order to determine the YS, TS, and UEL (uniform elongation) of the test specimen. In this tensile test, the 0.2%-proof stress of the test specimen was considered to be the YS of the test specimen.

<Bend Test>

A strip test specimen having a width of 35 mm and a length of 100 mm was taken from each of the steel sheets 1 to 45 such that the direction of the bending axis of the test specimen was parallel to the rolling direction and subjected to a bend test. Specifically, a 90°-V bend test was conducted at a stroke speed of 10 mm/sec, a pressing load of 10 ton, a press-holding time of 5 seconds, and a bending radius R of 1.5 mm. An edge line portion at the apex of the bend was observed using a loupe with a 10 power magnification. An evaluation of "Poor" was given when a crack having a length of 1 mm or more was confirmed. An evaluation of "Excellent" was given when the length of a crack was less than 1 mm.

<Spot Weld Test>

The test was conducted under the following conditions: electrode: DR6 mm-40R, pressure applied: 4802 N (490 kgf), initial pressurization time: 30 cycles/60 Hz, welding time: 17 cycles/60 Hz, and holding time: 1 cycle/60 Hz. For each of the steel sheets, the test current was changed at intervals of 0.2 kA while the test current was 4.6 to 10.0 kA and at intervals of 0.5 kA from the time the test current reached 10.0 kA to the time welding was completed. Each of the test specimens was subjected to a cross tensile test, and the diameter of the weld nugget at the weld zone of the test specimen was measured. The cross tensile test of a weld joint of resistance spot welding was conducted in accordance with JIS Z 3137. The diameter of the weld nugget was measured in accordance with JIS Z 3139 in the following manner. A symmetric, circular plug-portion of each of the test specimens, which was formed by resistance spot welding, was cut in half by a suitable method along a cross section perpendicular to the surface of the steel sheet, the cross section passing through approximately the center of the weld point. The cut section of the test specimen was ground and corroded. Subsequently, the microstructure in the cross section of the test specimen was observed with an optical microscope in order to measure the diameter of the weld nugget. In this test, the maximum diameter of the molten zone excluding the corona bond zone was considered to be the diameter of the weld nugget. Welded materials in which the diameter of the weld nugget was $4t^{1/2}$ (mm) (t: thickness of the steel sheet) or more were subjected to the cross tensile test. An evaluation of "Excellent" was given when fracture occurred in the base material. An evaluation of "Poor" was given when fracture occurred in the weld nugget. Tables 4 and 5 summarize the results.

TABLE 1

| Steel | Composition (mass %) | | | | | | | | | | | | K | Remarks |
|---|---|---|---|---|---|---|---|---|---|---|---|---|---|---|
| | C | Si | Mn | P | S | Al | N | Cr | Ti | Nb | B | Others | | |
| A | 0.09 | 0.5 | 2.5 | 0.020 | 0.002 | 0.032 | 0.004 | 0.590 | 0.021 | 0.040 | 0.0028 | — | 3.6 | Within the preferred range of Invention |
| B | 0.06 | 0.7 | 2.9 | 0.015 | 0.003 | 0.033 | 0.003 | 0.630 | 0.020 | 0.045 | 0.0036 | — | 4.2 | Within the preferred range of Invention |
| C | 0.12 | 0.3 | 2.2 | 0.020 | 0.002 | 0.015 | 0.003 | 0.850 | 0.019 | 0.037 | 0.0022 | — | 3.6 | Within the preferred range of Invention |
| D | 0.09 | 0.3 | 2.4 | 0.027 | 0.001 | 0.040 | 0.003 | 0.660 | 0.051 | 0.026 | 0.0039 | — | 3.9 | Within the preferred range of Invention |
| E | 0.12 | 0.3 | 2.5 | 0.012 | 0.005 | 0.028 | 0.002 | 0.600 | 0.079 | 0.011 | 0.0031 | — | 3.8 | Within the preferred range of Invention |
| F | 0.10 | 0.4 | 2.5 | 0.005 | 0.003 | 0.033 | 0.003 | 0.450 | 0.020 | 0.041 | 0.0028 | Mo:0.1 | 3.5 | Within the preferred range of Invention |
| G | 0.12 | 0.5 | 2.2 | 0.003 | 0.002 | 0.039 | 0.004 | 0.560 | 0.015 | 0.040 | 0.0029 | V:0.05 | 3.3 | Within the preferred range of Invention |
| H | 0.10 | 0.1 | 2.3 | 0.021 | 0.002 | 0.044 | 0.003 | 0.550 | 0.054 | 0.044 | 0.0035 | Ni:0.5 | 3.7 | Within the preferred range of Invention |
| I | 0.08 | 0.1 | 3.0 | 0.013 | 0.003 | 0.025 | 0.003 | 0.610 | 0.021 | 0.034 | 0.0026 | Cu:0.2 | 4.3 | Within the preferred range of Invention |
| J | 0.09 | 0.2 | 2.7 | 0.016 | 0.003 | 0.036 | 0.005 | 0.600 | 0.020 | 0.041 | 0.0030 | Ca:0.001 | 4.0 | Within the preferred range of Invention |
| K | 0.09 | 0.4 | 2.3 | 0.012 | 0.002 | 0.024 | 0.001 | 0.730 | 0.008 | 0.043 | 0.0023 | REM:0.002 | 3.5 | Within the preferred range of Invention |
| L | <u>0.03</u> | 0.4 | 2.6 | 0.006 | 0.004 | 0.025 | 0.003 | 0.550 | 0.021 | 0.038 | 0.0030 | — | 3.8 | Out of the preferred range of Invention |
| M | <u>0.18</u> | 0.5 | 2.6 | 0.010 | 0.003 | 0.032 | 0.004 | 0.600 | 0.020 | 0.039 | 0.0028 | — | 3.7 | Out of the preferred range of Invention |
| N | 0.11 | 0.3 | <u>1.4</u> | 0.011 | 0.002 | 0.035 | 0.002 | 0.810 | 0.015 | 0.042 | 0.0035 | — | 3.0 | Out of the preferred range of Invention |
| O | 0.07 | 0.1 | 2.8 | 0.014 | 0.002 | 0.035 | 0.003 | <u>0.005</u> | 0.018 | 0.041 | 0.0034 | — | 3.4 | Out of the preferred range of Invention |
| P | 0.08 | 0.5 | 2.4 | 0.013 | 0.002 | 0.029 | 0.003 | 0.580 | <u>0.001</u> | 0.035 | 0.0033 | — | 3.6 | Out of the preferred range of Invention |
| Q | 0.09 | 0.3 | 2.7 | 0.018 | 0.003 | 0.041 | 0.002 | 0.510 | 0.016 | <u>0.003</u> | 0.0027 | — | 3.8 | Out of the preferred range of Invention |
| R | 0.09 | 0.2 | 2.1 | 0.015 | 0.002 | 0.041 | 0.002 | 0.750 | 0.019 | 0.040 | <u>0.0002</u> | — | 3.0 | Out of the preferred range of Invention |
| S | 0.12 | 0.8 | 2.3 | 0.022 | 0.003 | 0.041 | 0.002 | 0.350 | 0.019 | 0.040 | 0.0020 | — | <u>2.8</u> | Out of the preferred range of Invention |
| T | 0.08 | 0.3 | 1.9 | 0.018 | 0.003 | 0.035 | 0.003 | 0.430 | 0.023 | 0.033 | 0.0025 | — | <u>2.8</u> | Out of the preferred range of Invention |

TABLE 2

| Steel sheet No. | Steel | Hot-rolling conditions Retention time at 600° C. to 700° C. (sec.) | Coiling temperature (° C.) | Cold-rolling conditions Cold-rolling reduction ratio (%) | Annealing conditions | | |
|---|---|---|---|---|---|---|---|
| | | | | | Average heating rate (° C./sec,) | Target heating temperature (° C.) | Time to reach annealing temperature (sec.) |
| 1 | A | 2 | 560 | 50 | 8 | 750 | 180 |
| 2 | | 2 | 560 | 50 | 8 | 720 | 20 |

TABLE 2-continued

| | | | | | | | |
|---|---|---|---|---|---|---|---|
| 3 | | 12 | 550 | 55 | 10 | 740 | 180 |
| 4 | | 2 | 650 | 55 | 10 | 740 | 180 |
| 5 | | 2 | 550 | 10 | 10 | 740 | 180 |
| 6 | | 2 | 550 | 55 | 1 | 740 | 180 |
| 7 | | 1 | 500 | 60 | 10 | 650 | 180 |
| 8 | | 1 | 500 | 60 | 10 | 700 | 180 |
| 9 | | 2 | 550 | 50 | 10 | 720 | 180 |
| 10 | | 2 | 550 | 50 | 8 | 720 | 180 |
| 11 | | 2 | 550 | 50 | 8 | 730 | 180 |
| 12 | | 2 | 550 | 40 | 15 | 750 | 180 |
| 13 | | 2 | 550 | 40 | 15 | 750 | 180 |
| 14 | | 2 | 550 | 40 | 15 | 750 | 180 |
| 15 | B | 1 | 500 | 65 | 15 | 750 | 180 |
| 16 | | — | 700 | 65 | 15 | 750 | 180 |
| 17 | | 1 | 500 | 65 | 15 | 750 | 180 |
| 18 | C | 5 | 500 | 50 | 8 | 700 | 180 |
| 19 | | 5 | 500 | 50 | 8 | 730 | 300 |
| 20 | | 5 | 500 | 50 | 8 | 710 | 180 |
| 21 | | 5 | 500 | 50 | 8 | 720 | 800 |
| 22 | | 5 | 500 | 50 | 10 | 740 | 180 |

| | Annealing conditions | | | | | |
|---|---|---|---|---|---|---|
| Steel sheet No. | Annealing temperature (° C.) | Annealing-temperature holding time (sec.) | Average cooling rate (° C./sec.) | Cooling-stop temperature (° C.) | Holding time (sec.) | Type of plating film * | Remarks |
| 1 | 800 | 120 | 10 | 530 | 30 | GA | Invention example |
| 2 | 765 | 200 | 8 | 480 | 100 | GI | Invention example |
| 3 | 780 | 200 | 10 | 500 | 80 | GA | Comparative example |
| 4 | 780 | 200 | 10 | 500 | 80 | GA | Comparative example |
| 5 | 780 | 200 | 10 | 500 | 80 | GA | Comparative example |
| 6 | 780 | 200 | 10 | 500 | 80 | GA | Comparative example |
| 7 | 780 | 200 | 10 | 500 | 80 | GA | Comparative example |
| 8 | 710 | 200 | 10 | 500 | 80 | GA | Comparative example |
| 9 | 780 | 5 | 10 | 500 | 80 | GA | Comparative example |
| 10 | 800 | 1500 | 10 | 500 | 80 | GA | Comparative example |
| 11 | 770 | 200 | 1 | 500 | 80 | GA | Comparative example |
| 12 | 800 | 300 | 10 | 400 | 100 | GA | Comparative example |
| 13 | 800 | 300 | 10 | 650 | 100 | GA | Comparative example |
| 14 | 800 | 300 | 10 | 500 | 1200 | GA | Comparative example |
| 15 | 770 | 100 | 5 | 460 | 100 | GA | Invention example |
| 16 | 770 | 100 | 5 | 460 | 100 | GA | Comparative example |
| 17 | 850 | 100 | 10 | 460 | 100 | GA | Comparative example |
| 18 | 800 | 100 | 10 | 500 | 80 | GA | Invention example |
| 19 | 760 | 200 | 10 | 520 | 50 | GA | Invention example |
| 20 | 810 | 200 | 10 | 460 | 120 | CR | Invention example |
| 21 | 765 | 200 | 8 | 480 | 100 | GA | Comparative example |
| 22 | 780 | 200 | 2 | 500 | 80 | GA | Comparative example |

* CR: Cold-rolled steel sheet, GI: Hot-dip galvanized steel sheet, GA: Hot-dip galvannealed steel sheet

TABLE 3

| Steel sheet No. | Steel | Hot-rolling conditions | | Cold-rolling conditions Cold-rolling reduction ratio (%) | Annealing conditions | | |
|---|---|---|---|---|---|---|---|
| | | Retention time at 600° C. to 700° C. (sec.) | Coiling temperature (° C.) | | Average heating rate (° C./sec,) | Target heating temperature (° C.) | Time to reach annealing temperature (sec.) |
| 23 | D | 1 | 450 | 55 | 10 | 740 | 180 |
| 24 | | <u>11</u> | 450 | 55 | 10 | 740 | 180 |
| 25 | | 1 | 450 | 55 | <u>3</u> | 740 | 180 |
| 26 | E | 2 | 500 | 60 | 10 | 690 | 180 |
| 27 | | 2 | 500 | 60 | 10 | 690 | 180 |
| 28 | | 2 | 500 | 60 | 10 | 690 | 180 |
| 29 | F | 2 | 550 | 50 | 8 | 720 | 180 |
| 30 | | 2 | 550 | 50 | 8 | 700 | 180 |
| 31 | G | 2 | 550 | 50 | 8 | 730 | 180 |
| 32 | H | 2 | 550 | 40 | 5 | 700 | 300 |
| 33 | I | 2 | 550 | 40 | 15 | 730 | 120 |
| 34 | | 2 | 550 | 40 | 15 | 730 | 120 |
| 35 | J | 2 | 550 | 40 | 15 | 750 | 180 |
| 36 | K | 2 | 550 | 50 | 15 | 750 | 180 |
| 37 | L | 2 | 550 | 50 | 15 | 750 | 180 |
| 38 | M | 2 | 550 | 50 | 15 | 750 | 180 |
| 39 | N | 2 | 550 | 50 | 15 | 770 | 180 |
| 40 | O | 2 | 550 | 50 | 15 | 750 | 180 |
| 41 | P | 2 | 550 | 50 | 15 | 750 | 180 |
| 42 | Q | 2 | 550 | 50 | 15 | 750 | 180 |
| 43 | R | 2 | 550 | 50 | 15 | 750 | 180 |
| 44 | S | 2 | 550 | 50 | 15 | 750 | 180 |
| 45 | T | 2 | 550 | 50 | 15 | 750 | 180 |

| Steel sheet No. | Annealing conditions | | | | | Type of plating film * | Remarks |
|---|---|---|---|---|---|---|---|
| | Annealing temperature (° C.) | Annealing-temperature holding time (sec.) | Average cooling rate (° C./sec.) | Cooling-stop temperature (° C.) | Holding time (sec.) | | |
| 23 | 780 | 200 | 10 | 500 | 80 | GA | Invention example |
| 24 | 780 | 200 | 10 | 500 | 80 | GA | Comparative example |
| 25 | 780 | 200 | 10 | 500 | 80 | GA | Comparative example |
| 26 | 800 | 200 | 10 | 500 | 80 | GA | Invention example |
| 27 | <u>840</u> | 200 | 15 | 500 | 80 | GA | Comparative example |
| 28 | 780 | <u>1500</u> | 10 | 500 | 80 | GA | Comparative example |
| 29 | 800 | 200 | 10 | 500 | 80 | GI | Invention example |
| 30 | 820 | 200 | 10 | 500 | 80 | GA | Invention example |
| 31 | 770 | 200 | 10 | 500 | 120 | GA | Invention example |
| 32 | 785 | 200 | 10 | 500 | 100 | GA | Invention example |
| 33 | 780 | 300 | 10 | 530 | 250 | GA | Invention example |
| 34 | 800 | 180 | 10 | 530 | 60 | CR | Invention example |
| 35 | 775 | 300 | 10 | 500 | 100 | GA | Invention example |
| 36 | 760 | 100 | 50 | 500 | 30 | GI | Invention example |
| 37 | 780 | 150 | 50 | 500 | 30 | GA | Comparative example |
| 38 | 770 | 150 | 10 | 500 | 100 | GA | Comparative example |
| 39 | 790 | 150 | 50 | 500 | 15 | GI | Comparative example |
| 40 | 780 | 150 | 50 | 500 | 15 | GA | Comparative example |
| 41 | 780 | 150 | 10 | 500 | 100 | GA | Comparative example |
| 42 | 780 | 150 | 10 | 500 | 100 | GA | Comparative example |

TABLE 3-continued

| | | | | | | | | |
|---|---|---|---|---|---|---|---|---|
| 43 | 780 | 150 | 10 | 500 | 100 | | GA | Comparative example |
| 44 | 780 | 150 | 10 | 500 | 100 | | GA | Comparative example |
| 45 | 780 | 150 | 10 | 500 | 30 | | GA | Comparative example |

* CR: Cold-rolled steel sheet, GI: Hot-dip galvanized steel sheet, GA: Hot-dip galvannealed steel sheet

TABLE 4

| Steel sheet No. | * Microstructure | | | | | | | Tensile properties | | | Spot weldability | Bendability | Remarks |
|---|---|---|---|---|---|---|---|---|---|---|---|---|---|
| | V(F) (%) | V(M) (%) | Others (%) | V(SF) (%) | d(F) (μm) | d(M) (μm) | V(LM) (%) | YS (MPa) | TS (MPa) | TS × UEL (MPa · %) | | | |
| 1 | 31 | 69 | 0 | 0 | 2.2 | 3.5 | 2 | 885 | 1259 | 6925 | Excellent | Excellent | Invention example |
| 2 | 35 | 65 | 0 | 0 | 1.6 | 2.1 | 4 | 877 | 1231 | 7263 | Excellent | Excellent | Invention example |
| 3 | 68 | 32 | 0 | 5 | 5.6 | 2.5 | 21 | 639 | 1042 | 9274 | Excellent | Excellent | Comparative example |
| 4 | 70 | 30 | 0 | 6 | 5.8 | 3.0 | 22 | 626 | 1020 | 9384 | Excellent | Excellent | Comparative example |
| 5 | 35 | 65 | 0 | 18 | 2.9 | 2.3 | 5 | 871 | 1226 | 5762 | Excellent | Poor | Comparative example |
| 6 | 55 | 45 | 0 | 37 | 12 | 4.0 | 25 | 723 | 1116 | 6361 | Excellent | Poor | Comparative example |
| 7 | 56 | 44 | 0 | 33 | 11 | 3.8 | 28 | 740 | 1132 | 6113 | Excellent | Poor | Comparative example |
| 8 | 88 | 12 | 0 | 56 | 12 | 1.6 | 12 | 536 | 788 | 8983 | Excellent | Excellent | Comparative example |
| 9 | 51 | 49 | 0 | 4 | 3.6 | 1.1 | 20 | 746 | 1148 | 7118 | Excellent | Poor | Comparative example |
| 10 | 39 | 46 | 15 | 3 | 5.8 | 12 | 10 | 693 | 1139 | 6037 | Excellent | Poor | Comparative example |
| 11 | 55 | 45 | 0 | 3 | 4.9 | 1.7 | 19 | 657 | 1135 | 7832 | Excellent | Poor | Comparative example |
| 12 | 40 | 25 | 35 | 1 | 2.8 | 1.6 | 9 | 642 | 1015 | 8019 | Excellent | Excellent | Comparative example |
| 13 | 58 | 42 | 0 | 2 | 3.9 | 2.0 | 20 | 599 | 1088 | 8378 | Excellent | Excellent | Comparative example |
| 14 | 40 | 22 | 38 | 1 | 2.5 | 1.1 | 5 | 674 | 1005 | 7940 | Excellent | Excellent | Comparative example |
| 15 | 32 | 68 | 0 | 0 | 1.8 | 1.2 | 1 | 903 | 1195 | 7648 | Excellent | Excellent | Invention example |
| 16 | 57 | 43 | 0 | 2 | 4.1 | 2.6 | 16 | 774 | 1125 | 7763 | Excellent | Poor | Comparative example |
| 17 | 3 | 57 | 40 | 0 | 2.1 | 12 | 0 | 898 | 1183 | 5797 | Excellent | Poor | Comparative example |
| 18 | 36 | 64 | 0 | 0 | 2.7 | 3.2 | 6 | 844 | 1230 | 8733 | Excellent | Excellent | Invention example |
| 19 | 38 | 62 | 0 | 0 | 1.4 | 1.8 | 7 | 848 | 1271 | 8389 | Excellent | Excellent | Invention example |
| 20 | 23 | 60 | 17 | 0 | 3.1 | 3.5 | 7 | 866 | 1219 | 7070 | Excellent | Excellent | Invention example |
| 21 | 40 | 60 | 0 | 6 | 11 | 5.6 | 13 | 778 | 1201 | 7326 | Excellent | Poor | Comparative example |
| 22 | 51 | 49 | 0 | 9 | 5.2 | 2.9 | 16 | 705 | 1156 | 7861 | Excellent | Poor | Comparative example |

* V(F): Area ratio of ferrite, V(M): Area ratio of martensite, Others: Area ratio of phases other than ferrite or martensite, V(SF): Area ratio of ferrite grains having a size of 10 μm or more in the surface-layer portion which extends 20 to 100 μm below the surface of the steel sheet, d(F): Average crystal grain size of ferrite, d(M): Average crystal grain size of martensite, V(LM): Area ratio of martensite grains adjacent to only ferrite grains

TABLE 5

| Steel sheet No. | * Microstructure | | | | | | | Tensile properties | | | Spot weldability | Bendability | Remarks |
|---|---|---|---|---|---|---|---|---|---|---|---|---|---|
| | V(F) (%) | V(M) (%) | Others (%) | V(SF) (%) | d(F) (μm) | d(M) (μm) | V(LM) (%) | YS (MPa) | TS (MPa) | TS × UEL (MPa · %) | | | |
| 23 | 40 | 60 | 0 | 0 | 1.9 | 1.7 | 2 | 855 | 1200 | 7080 | Excellent | Excellent | Invention example |
| 24 | 65 | 35 | 0 | 3 | 3.3 | 2.2 | 25 | 674 | 1030 | 8343 | Excellent | Excellent | Comparative example |
| 25 | 56 | 44 | 0 | 35 | 11 | 3.3 | 18 | 682 | 1129 | 8242 | Excellent | Poor | Comparative example |
| 26 | 37 | 63 | 0 | 0 | 1.3 | 1.4 | 6 | 913 | 1246 | 9345 | Excellent | Excellent | Invention example |
| 27 | 6 | 62 | 32 | 0 | 2.2 | 2.5 | 3 | 870 | 1198 | 6391 | Excellent | Poor | Comparative example |
| 28 | 39 | 61 | 0 | 18 | 12 | 6.1 | 11 | 748 | 1227 | 9080 | Excellent | Poor | Comparative example |
| 29 | 38 | 62 | 0 | 0 | 2.4 | 2.8 | 5 | 859 | 1224 | 7589 | Excellent | Excellent | Invention example |
| 30 | 10 | 71 | 19 | 0 | 2.9 | 3.3 | 1 | 916 | 1260 | 7056 | Excellent | Excellent | Invention example |
| 31 | 34 | 66 | 0 | 0 | 1.8 | 2.3 | 2 | 919 | 1280 | 8064 | Excellent | Excellent | Invention example |
| 32 | 37 | 63 | 0 | 0 | 2.1 | 2.5 | 5 | 891 | 1225 | 6860 | Excellent | Excellent | Invention example |
| 33 | 36 | 61 | 3 | 0 | 1.9 | 2.5 | 4 | 910 | 1214 | 6920 | Excellent | Excellent | Invention example |
| 34 | 16 | 74 | 10 | 0 | 2.5 | 2.7 | 1 | 903 | 1253 | 6766 | Excellent | Excellent | Invention example |
| 35 | 35 | 65 | 0 | 0 | 1.6 | 2.1 | 1 | 898 | 1264 | 7331 | Excellent | Excellent | Invention example |
| 36 | 40 | 60 | 0 | 0 | 1.8 | 1.8 | 4 | 852 | 1216 | 7418 | Excellent | Excellent | Invention example |
| 37 | 30 | 70 | 0 | 1 | 2.3 | 2.5 | 1 | 900 | 1147 | 6997 | Excellent | Poor | Comparative example |
| 38 | 35 | 65 | 0 | 0 | 1.6 | 1.5 | 5 | 787 | 1358 | 8827 | Poor | Poor | Comparative example |
| 39 | 38 | 32 | 30 | 12 | 2.9 | 2.1 | 12 | 733 | 1009 | 9182 | Excellent | Excellent | Comparative example |
| 40 | 31 | 38 | 31 | 8 | 2.7 | 2.0 | 10 | 726 | 1065 | 7881 | Excellent | Excellent | Comparative example |
| 41 | 40 | 25 | 35 | 3 | 11 | 4.9 | 11 | 639 | 997 | 9172 | Excellent | Excellent | Comparative example |
| 42 | 40 | 59 | 1 | 33 | 16 | 5.8 | 13 | 769 | 1181 | 5905 | Excellent | Poor | Comparative example |
| 43 | 62 | 31 | 7 | 2 | 3.6 | 4.7 | 20 | 625 | 1002 | 8818 | Excellent | Excellent | Comparative example |
| 44 | 44 | 56 | 0 | 3 | 1.9 | 1.6 | 18 | 753 | 1193 | 8709 | Excellent | Poor | Comparative example |
| 45 | 42 | 58 | 0 | 3 | 2.2 | 1.8 | 17 | 772 | 1186 | 8709 | Excellent | Poor | Comparative example |

* V(F): Area ratio of ferrite, V(M): Area ratio of martensite, Others: Area ratio of phases other than ferrite or martensite, V(SF): Area ratio of ferrite grains having a size of 10 μm or more in the surface-layer portion which extends 20 to 100 μm below the surface of the steel sheet, d(F): Average crystal grain size of ferrite, d(M): Average crystal grain size of martensite, V(LM): Area ratio of martensite grains adjacent to only ferrite grains It is confirmed that the steel sheets according to aspects of the present invention had a YS of 780 MPa or more, a TS of 1180 MPa or more, a TS×UEL of 6000 MPa·% or more, good bending workability, and excellent spot weldability.

Therefore, according to the present invention, a high-strength steel sheet having excellent spot weldability, excellent ductility, and excellent bending workability may be produced. This advantageously contributes to a reduction in the weights of automobiles and greatly contributes to the improvement of properties of automobile bodies.

According to the present invention, a high-strength steel sheet having a YS of 780 MPa or more, a TS of 1180 MPa or more, a TS×UEL of 6000 MPa·% or more, good bending workability, and excellent spot weldability may be produced. Using the high-strength steel sheet according to the present invention as a material of automotive parts may contribute to a reduction in the weights of automobiles and greatly contribute to the improvement of properties of automobile bodies.

The invention claimed is:

1. A high-strength steel sheet comprising a composition containing, by mass, C: 0.05% to 0.15%, Si: 0.01% to 1.00%, Mn: 1.5% to 4.0%, P: 0.100% or less, S: 0.02% or less, Al: 0.01% to 0.50%, Cr: 0.010% to 2.000%, Nb: 0.005% to 0.100%, Ti: 0.005% to 0.100%, B: 0.0005% to 0.0050%, and the balance being Fe and inevitable impurities, wherein K represented by Formula (I) below is 3.0 or more; and a microstructure in which, when the microstructure is observed in a cross section of the steel sheet which is perpendicular to the surface of the steel sheet at a depth of ¼ thickness below the surface of the steel sheet, the area ratio of ferrite is 8% to 45%, the area ratio of martensite is 55% to 85%, the proportion of martensite grains adjacent to only ferrite grains in the entire microstructure is 15% or less, the average crystal grain sizes of ferrite and martensite are each 10 μm or less, and the area ratio of ferrite grains having a size of 10 μm or more to all ferrite grains included in a portion of the steel sheet which extends from 20 to 100 μm below the surface of the steel sheet is less than 5%, $$K=-0.4\times[Si]+1.0\times[Mn]+1.3\times[Cr]+200\times[B] \quad \text{Formula (I),}$$

where [Si] represents the Si content [mass %], [Mn] represents the Mn content [mass %], [Cr] represents the Cr content [mass %], and [B] represents the B content [mass], and wherein the steel sheet has a yield strength (YS) of 780 MPa or more and a tensile strength (TS) of 1180 MPa or more.

2. The high-strength steel sheet according to claim 1, further containing, by mass, at least one element selected from Mo: 0.005% to 2.000%, V: 0.005% to 2.000%, Ni: 0.005% to 2.000%, and Cu: 0.005% to 2.000%.

3. The high-strength steel sheet according to claim 1, further containing, by mass, at least one element selected from Ca: 0.001% to 0.005% and REM: 0.001% to 0.005%.

4. The high-strength steel sheet according to claim 1, being a high-strength cold-rolled steel sheet.

5. The high-strength steel sheet according to claim 1, provided with a hot-dip galvanizing film deposited on a surface of the steel sheet.

6. The high-strength steel sheet according to claim 5, wherein the hot-dip galvanizing film is a hot-dip galvannealing film.

7. A method for producing a high-strength steel sheet having a yield strength (YS) of 780 MPa or more and a tensile strength (TS) of 1180 MPa or more, the method comprising a hot-rolling step in which, when a slab having the composition according to claim 1 is hot-rolled, a finish-rolled steel sheet is cooled such that the steel sheet is retained at 600° C. to 700° C. for 1-10 seconds in total after being finish-rolled, and the cooled steel sheet is coiled at 400° C. or more and less than 600° C.; a cold-rolling step in which, subsequent to the hot-rolling step, the hot-rolled steel sheet is cold-rolled at a rolling reduction ratio of more than 20%; an annealing step in which, subsequent to the cold-rolling step, the cold-rolled steel sheet is heated to a target heating temperature of 680° C. or more at an average heating rate of 5° C./sec. or more, further heated to an annealing temperature of 720° C. to 820° C. within 500 seconds, and subsequently held at the annealing temperature for 10 to 1000 seconds; and a cooling step in which the annealed cold-rolled steel sheet is cooled to a cooling-stop temperature of 450° C. to 550° C. at an average cooling rate of 3° C./sec. or more and subsequently held at the cooling-stop temperature for 1000 seconds or less.

8. The method for producing a high-strength steel sheet according to claim 7, the method further comprising a galvanizing step in which a hot-dip galvanizing treatment is performed subsequent to the cooling step after annealing the cold-rolled steel sheet.

9. The method for producing a high-strength steel sheet according to claim 8, the method further comprising an alloying step in which an alloying treatment is performed subsequent to the galvanizing step.

* * * * *

UNITED STATES PATENT AND TRADEMARK OFFICE
CERTIFICATE OF CORRECTION

PATENT NO. : 10,526,676 B2
APPLICATION NO. : 15/104609
DATED : January 7, 2020
INVENTOR(S) : Hiroshi Hasegawa et al.

Page 1 of 1

It is certified that error appears in the above-identified patent and that said Letters Patent is hereby corrected as shown below:

In the Claims

In Column 21, Line 44, in Claim 1: "[mass]" should read --[mass%]--.

Signed and Sealed this
Twenty-fifth Day of February, 2020

Andrei Iancu
*Director of the United States Patent and Trademark Office*